United States Patent
Okino et al.

Patent Number: 5,633,677
Date of Patent: May 27, 1997

[54] TELEVISION CAMERA APPARATUS

[75] Inventors: Tadashi Okino; Kunio Ninomiya, both of Kanagawa-ken, Japan

[73] Assignee: Canon Kabushiki Kaisha, Tokyo, Japan

[21] Appl. No.: 267,182

[22] Filed: Jun. 28, 1994

Related U.S. Application Data

[63] Continuation of Ser. No. 906,025, Jun. 26, 1992, abandoned, which is a continuation of Ser. No. 618,046, Nov. 26, 1990, abandoned.

[30] Foreign Application Priority Data

Nov. 30, 1989 [JP] Japan ................ 1-309328
Nov. 30, 1989 [JP] Japan ................ 1-309330
Jan. 23, 1990 [JP] Japan ................ 2-011850

[51] Int. Cl.$^6$ ........................... H04N 9/235
[52] U.S. Cl. ............ 348/229; 348/207; 348/234
[58] Field of Search ....................... 348/223, 229, 348/234, 262, 255, 256, 254; H04N 5/225

[56] References Cited

U.S. PATENT DOCUMENTS

| | | |
|---|---|---|
| 2,548,829 | 4/1951 | Sziklai et al. ............. 358/29 |
| 4,608,595 | 8/1986 | Nakayama et al. ......... 358/29 |
| 4,635,101 | 1/1987 | Nakayama ................ 358/21 R |
| 4,750,032 | 6/1988 | Nakayama ................ 358/29 |
| 4,845,551 | 7/1989 | Matsumoto ............... 358/80 |
| 4,883,360 | 11/1989 | Kawada et al. .......... 356/402 |
| 4,899,212 | 2/1990 | Kaneko et al. ............ 358/29 |

FOREIGN PATENT DOCUMENTS 60-21692  10/1985  Japan .............. H04N 9/77

*Primary Examiner*—Wendy R. Greening
*Assistant Examiner*—Tuan V. Ho
*Attorney, Agent, or Firm*—Robin, Blecker, Daley & Driscoll

[57] ABSTRACT

In a TV camera apparatus having an image sensor which photo-electrically converts image sensing light coming from an object, a signal processing circuit which converts a signal output from the image sensor into a luminance signal and color-difference signals and negative-to-positive inverters which invert the luminance signal and the color-difference signals from negative to positive, variable gain amplifiers are arranged within color-difference signal systems to amplify the color-difference signals; and the variable gain amplifiers are arranged to be controlled on the basis of the luminance signal.

2 Claims, 11 Drawing Sheets

TELEVISION CAMERA APPARATUS

This is a continuation application under 37 CFR 1.62 of prior application Ser. No. 07/906,025, filed Jun. 26, 1992, abandoned which is a continuation of Ser. No. 07/618,046 filed Nov. 26, 1990 (abandoned).

BACKGROUND OF THE INVENTION

1. Field of the Invention

This invention relates to a television camera apparatus having a negative-to-positive inverting function.

2. Description of the Related Art

FIG. 1 of the accompanying drawings shows the circuit arrangement of the conventional color TV camera apparatus of the kind having a negative-to-positive inverting function. Referring to FIG. 1, image sensing light 2 coming from a shooting object 1 is guided to an image sensor 5 via a lens 3 and an iris 4. The image sensor 5 photo-electrically converts the image sensing light 2 coming from the object 1 and produces color signals for colors R (red), G (green) and B (blue). Each of the color signals R, G and B are supplied to a signal processing circuit 6. The circuit 6 then performs suitable signal processing actions such as white balance adjustment, gamma correction, etc. These processes are followed by a matrix process. After the matrix process, the signals are produced in the form of a luminance signal Y and color-difference signals R-Y and B-Y. The luminance signal Y and the color-difference signals R-Y and B-Y are inverted from negative to positive by negative-to-positive inverters 7a, 7b and 7c. The inverted luminance signal $\overline{Y}$ and the inverted color-difference signals $\overline{R-Y}$ and $\overline{B-Y}$ are supplied to an encoder 8. These inverted signals are then converted into a video signal, which is output to the outside.

The above-stated inverting process is mathematically expressed by the following formula:

$$\left. \begin{array}{c} \overline{Y} = A - Y \\ \overline{R-Y} = -(R-Y) \\ \overline{B-Y} = -(B-Y) \end{array} \right\} \quad \text{(I)}$$

In other words, the inversion of the luminance signal comprises obtaining a difference between a reference level signal A and the luminance signal Y. The inversion of each of the color-difference signals comprises a process of inverting the polarity thereof.

However, in the conventional color TV camera apparatus of the above-stated kind, the relation of the level of luminance to the degree of color saturation is reversed when the open position (aperture value) of a light-quantity adjusting iris 4 is shifted from an apposite light-quantity position in the negative-to-positive inverted state. This has presented a problem, because the natural state of the object image is reversed to degrade its colors and thus hardly gives any adequate image.

More specifically, in the event of negative-to-positive inversion, the degree of color saturation becomes higher when the luminance level of the video signal output becomes lower as a whole. It becomes lower when the luminance level becomes higher. Thus, this acts contrary to the natural state. For example, when the luminance level in the video signal output becomes lower, if the iris 4 is opened to make the luminance signal Y larger before inversion, the luminance signal $\overline{Y}$ after inversion becomes smaller as apparent from Formula (I) above. Further, since the iris 4 is opened in this instance, the absolute values |R-Y| and |B-Y| and of the color-difference signals R-Y and B-Y become larger than the values obtained when the light quantity is apposite. Therefore, the absolute values |$\overline{R-Y}$| and |$\overline{B-Y}$| of the color-difference signals $\overline{R-Y}$ and $\overline{B-Y}$ after inversion also become larger as apparent from the following formula:

$$\left. \begin{array}{c} |\overline{R-Y}| = |-(R-Y)| = |R-Y| \\ |\overline{B-Y}| = |-(B-Y)| = |B-Y| \end{array} \right\} \quad \text{(II)}$$

This means that the state of color is good at a part where the level of the input signal is high, i.e., where the level of the inverted signal is low, and is bad at a part where the level of the input signal is low, i.e., where the level of the inverted signal is high, even in the case of adequate incident light quantity. Thus, there is obtained a state which is reverse to the natural state. FIGS. 2(a) and 2(b) illustrate this state. FIG. 2(a) roughly shows the wave form of the video signal output obtained in a normal state without negative-to-positive inversion. The coloring is obtained in a relatively small amount of saturation a1 (the amplitude component of a carrier signal) at a part where the luminance level A1 is low. The coloring is obtained in a relatively large amount of saturation b1 at a part where the luminance level B1 is high. When this state is inverted, a wave form as shown in FIG. 2(b) is obtained. As shown, at a part where a luminance level A2 is high, there is a signal of a relatively small amount of saturation a2. At a part where a luminance level B2 is low, there is a signal of a relatively large amount of saturation b2.

Further, the conventional color TV camera apparatus of the above-stated kind has presented another problem, which is as follows: In a case where the object 1 is a negative photo film, the luminance level is low and the degree of color saturation is small. The whole picture is dark with very thin colors. In that case, it is hardly possible to obtain an adequate image.

As is well known, the negative photo film has such a characteristic that the quantity of light incident upon the film surface is in a non-linear relation to the blackening degree of the film. This is called a gamma characteristic. It varies to a less degree at a part where the incident light is in a larger quantity. In other words, an image is printed on the negative film in a state of being compressed at a high luminance level part. Therefore, an output produced by photo-electrically converting the light coming from the negative film by the image sensor is also obtained in a state of being compressed at its part where the luminance of the object is high before shooting. This is shown in FIGS. 3(a) to 3(e), which roughly show a case where a gray scale chart is employed as an object to be photographed. FIG. 3(a) shows the distribution of luminance of the chart obtained before shooting. The axis of abscissa shows the spatial position of the chart and the axis of ordinate the luminance level. Further, in FIG. 3(a), the axis of abscissa corresponds to the horizontal (H) direction which is usually used for the TV camera signal and is expressed as if parts in the vertical (V) direction of the TV camera signal are added together therewith. FIG. 3(b) shows an output signal (the signal G, for example) of the image sensor. This corresponds to the distribution of blackening degree of the negative film (object 1). In FIG. 3(b), what is shown in FIG. 3(a) is shown upside-down. Since the object is a negative film and because of the above-stated characteristic, the lower part of FIG. 3(b) (corresponding to the upper high luminance part of FIG. 3(a)) is salient in a non-linear state. Further, in FIG. 3(b), a broken line represents the output characteristic of the image sensor obtained when the blackening degree characteristic of the negative film is in a linear state. The signal which is thus obtained is supplied to the signal processing circuit 6 to undergo the gamma correction process (to obtain a gamma value of 0.45 by the gamma process within the TV camera) after white balance adjustment, and, then, the wave form of the signal becomes as shown in FIG. 3(c). The high level part of FIG. 3(b) is compressed in this case. In FIG. 3(c), a part indicated by a broken line represents a level obtained before the gamma correction process. The signals R and B are likewise processed. After that, the signals Y, R-Y and B-Y are formed through a matrix process. Since this is a so-called linear matrix process, the characteristics of these signals obtained before the matrix process are reflected as they are in the outputs of the matrix.

More specifically, as shown in FIG. 3(d), the luminance signal Y becomes a signal which is inverted and compressed as a whole as compared with the original level of the object. The levels of the color-difference signals are also transformed into a compressed shape.

Therefore, when the signals Y, R-Y and B-Y are processed through the inverters 7a, 7b and 7c, the normal output levels become lower as they are inverted with their levels having been compressed. As a result, the image thus obtained appears dark as a whole on the picture screen and in thin colors. FIG. 3(e) shows the luminance signal Y as in a state after the inversion.

Further, with respect to an image to be obtained from a negative film or the like by the conventional camera apparatus, each of the characteristics relative to, for example, the gains for gamma, black-and-white, clipping, amplification, etc., of the color-video-camera signal processing circuit is generally set on the basis of a positive image of an ordinary object. Generally, compared with an ordinary object, an object on a negative film has a less degree of difference between brightness and darkness in luminance. Further, when the object on the negative film is displayed on a monitor, the video signal output level becomes low to result in a dark image. If the iris is opened wider for brightening the image, linearity tends to be lost. Therefore, it has been hardly possible to obtain a luminance level with an adequate linearity.

SUMMARY OF THE INVENTION

This invention is to solve the above-stated problems. It is, therefore, an object of the invention to provide a TV camera apparatus which is capable of obtaining signals having a color saturation degree corresponding to the level of the luminance signal even in the event of negative-to-positive inversion, so that a good picture can be obtained in adequate colors.

To attain this object, a TV camera apparatus having an image sensor which photo-electrically converts image sensing light coming from a picture-taking object, a signal processing circuit which converts a signal output from the image sensor into a luminance signal and color-difference signals, and negative-to-positive inverters which perform negative-to-positive inverting action on the luminance signal and the color-difference signals is arranged according to this invention to comprise: variable gain amplifiers which are arranged within color-difference signal systems and have variable gains to amplify the color-difference signals; and a control circuit which is arranged to control the variable gain amplifiers on the basis of the luminance signal.

In the TV camera apparatus embodying this invention, the variable gain amplifiers are disposed in the color-difference signal systems and controlled on the basis of the luminance signal as mentioned above. This enables the embodiment to give signals having a color saturation degree corresponding to the level of the luminance signal even in the event of negative-to-positive inversion.

Further, a TV camera apparatus having an image sensor which photo-electrically converts light coming from a picture-taking object, a lens which images the light coming from the object on the image sensor, an iris which controls the quantity of light to be photo-electrically converted by the image sensor, a signal processing circuit which produces a video signal by processing signals obtained by photo-electrically converting the light, an encoder and inverters which invert signals supplied to the encoder from negative to positive is arranged according to this invention as another embodiment to comprise: at least one signal amplifier which is disposed in signal systems including the inverters.

The above-stated arrangement wherein at least one signal amplifier is provided in the signal systems including the negative-to-positive inverters enables the TV camera apparatus embodying this invention to give a bright picture even in the case of an image sensing operation on a negative film.

Further, a solid-state image sensing apparatus which is arranged according to this invention as a further embodiment thereof comprises: a solid-state image sensor which produces color signals by photo-electrically converting an object image; color signal amplifiers which are capable of varying the degree of amplifying the color signals; a video signal processing part which forms color-difference signals receiving the color signals from the color signal amplifiers; an encoder part which is arranged to produce a chrominance signal by receiving the color-difference signals from the video signal processing part and a subcarrier output from a subcarrier generating circuit and to output a luminance signal through an inverting/non-inverting amplifier which selects an inverting action or a non-inverting action on a luminance signal received from the video signal processing part; a chrominance signal amplifier and a luminance signal amplifier which receive the chrominance signal and the luminance signal from the encoder part and have variable degrees of amplification to amplify these signals respectively; a mixing circuit which receives and mixes a signal output from the chrominance signal amplifier and that of the luminance signal amplifier and produces a video signal by adding a burst signal and a synchronizing signal to a mixture signal thus obtained; the subcarrier generating circuit which is arranged to generate subcarriers with a phase difference of 90 degrees between them and to be capable of inverting them; and a negative/positive control part. To attain the above-stated object, the solid-state image sensing device is arranged to produce a control signal from the negative/positive control part to vary the amplifying degrees of the color signal amplifiers; to invert the phases of the subcarriers which have the 90 degree phase difference from each other and are output from the subcarrier generating circuit; to invert the phase of the luminance signal supplied to the luminance signal amplifier; and to control the changes of the amplifying degree of the chrominance signal amplifier and that of the luminance signal amplifier. Further, in the above-stated embodiment, a control signal is output from the negative/positive control part to lower the amplifying degrees of the color signal amplifiers; to supply the subcarriers which are output from the subcarrier generating circuit at a 90 degree phase difference from each other to the encoder part after inverting their phases; to invert the phase of the luminance signal to be supplied to the luminance signal amplifier; and to produce a video signal in positive colors, carrying out an image sensing action on a negative film by raising the amplifying degrees of the chrominance signal amplifier and the luminance signal amplifier.

With the embodiment arranged in the above-stated manner, color-difference signals are formed by photo-electrically converting an object image through the solid-state image sensor and by supplying them to the video signal processing part. An ordinary color video signal is formed by supplying the color-difference signals to the encoder part and the mixing circuit before it is output.

A control signal is output from the negative/positive control part to lower the amplifying degrees of the color signal amplifiers. The phases of subcarriers which are output from the subcarrier generating circuit with a phase difference of 90 degrees between them are inverted before they are supplied to the encoder part. The phase of the luminance signal to be supplied to the luminance signal amplifier is inverted. The amplifying degrees of the chrominance signal amplifier and the luminance signal amplifier are increased to give an adequate positive color video signal by performing an image sensing action on a negative film.

The above and other objects and features of the invention will become apparent from the following detailed description of embodiments thereof taken in conjunction with the accompanying drawings.

DETAILED DESCRIPTION OF THE PREFERRED EMBODIMENTS

Figure 1:
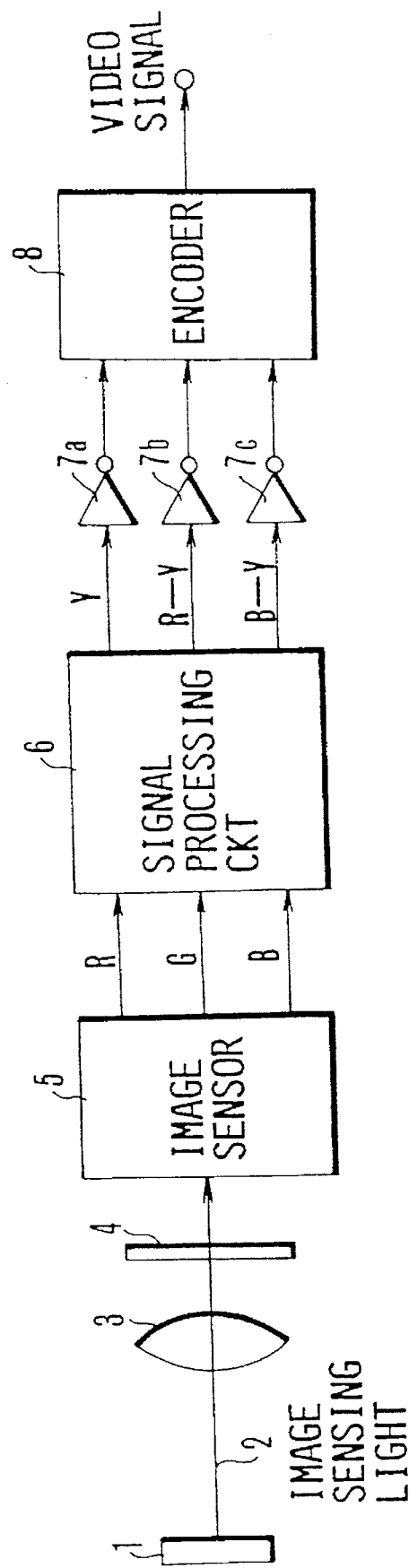
FIG. 1 is a diagram showing the circuit arrangement of the conventional TV camera apparatus.
Figure 4:
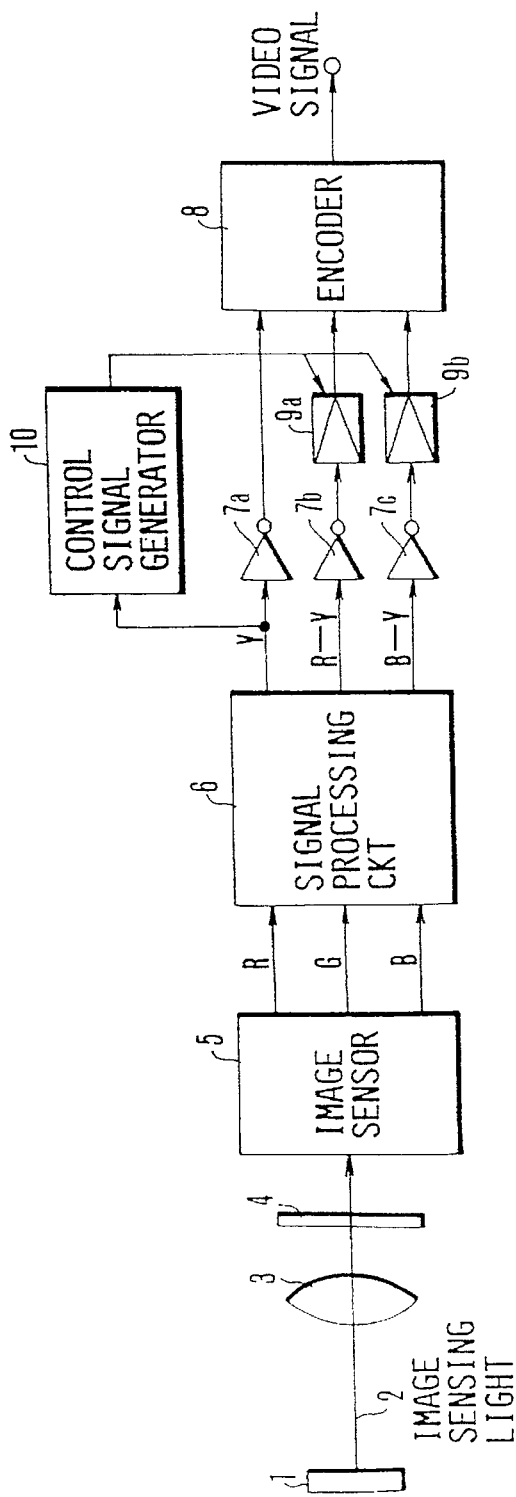
FIG. 4 is a diagram showing a TV camera apparatus arranged as a first embodiment of this invention.

FIG. 4 shows the arrangement of a first embodiment of this invention. The same component parts as those of FIG. 1 are indicated by the same reference numerals and any duplicative description is omitted. Voltage-controlled type variable amplifiers 9a and 9b are arranged in the color-difference signal systems to have variable gains. In this case, they are disposed behind the negative-to-positive inverters 7b and 7c. A control signal generator 10 is arranged to supply a gain control signal to the variable amplifiers 9a and 9b and to control them on the basis of the level of the luminance signal.

Figure 5:
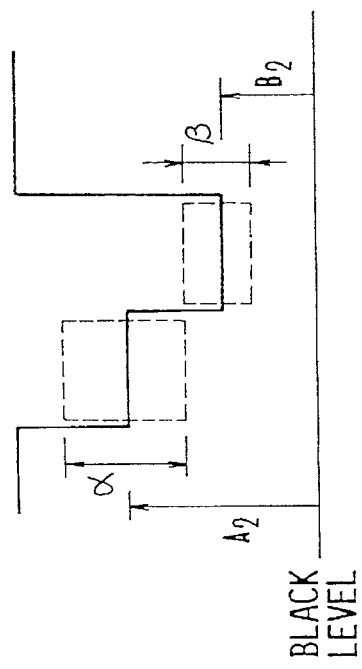
FIG. 5 is a waveform chart showing a video signal output from the same camera apparatus.

The TV camera apparatus arranged as the first embodiment of the invention operates as follows: The control signal generator 10 is arranged to form a control signal according to the luminance signal by varying the DC potential and the amplitude thereof and, if necessary, by inverting the polarity thereof for controlling the variable amplifiers 9a and 9b and to supply the control signal to the variable amplifiers 9a and 9b. In accordance with the level of the control signal received from the control signal generator 10, the variable amplifiers 9a and 9b control the level of the color-difference signals R-Y and B-Y. More specifically, the levels of the color-difference signals are controlled as follows: The gains of the variable amplifiers 9a and 9b are lowered to lower the levels of the color-difference signals and to lower the degree of color saturation at a part where the level of the luminance signal Y is high (where the level of the inverted luminance signal $\overline{Y}$ is low). Conversely, at a part where the level of the luminance signal Y is low (where the level of the inverted luminance signal $\overline{Y}$ is high), the gains of the variable amplifiers 9a and 9b are raised to increase the levels of the color-difference signals and to increase the degree of color saturation. FIG. 5 shows the result of this operation in a waveform chart.

Figure 2A:
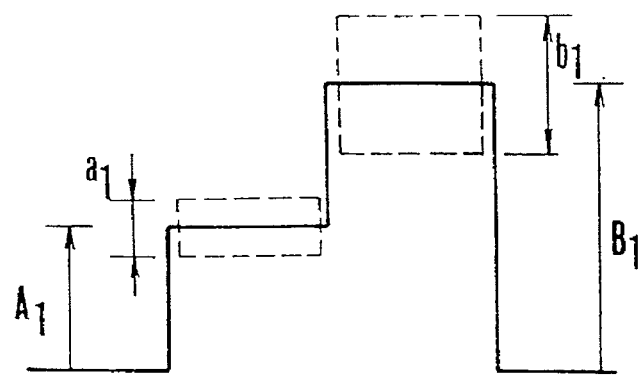
FIGS. 2(a) and 2(b) are waveform charts showing the video signal output from the above-stated camera apparatus.
Figure 2B:
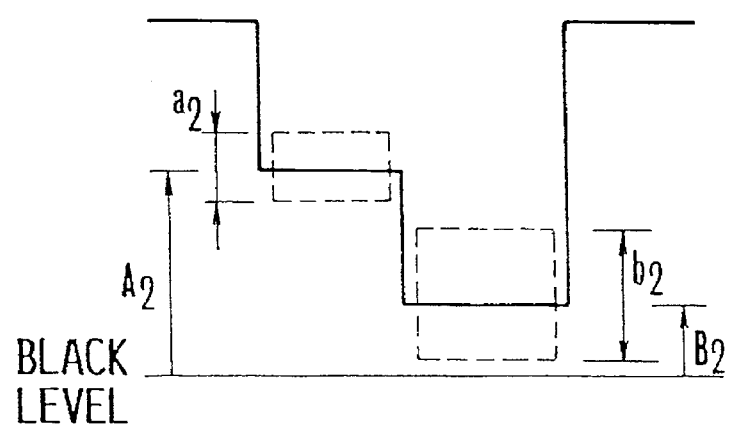
Figure 3A:
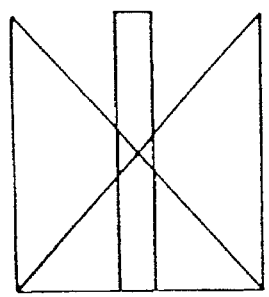
FIGS. 3(a) to 3(e) show image signals obtained by the conventional camera apparatus.
Figure 3B:
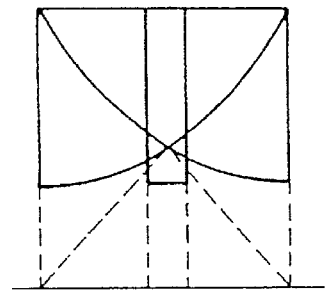
Figure 3C:
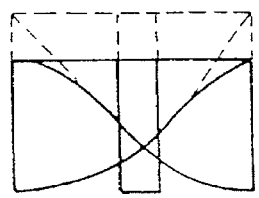
Figure 3D:
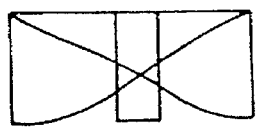
Figure 3E:
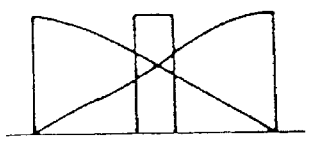

Referring to FIG. 5, a part where a luminance level A2 is high corresponds to a part where a luminance level A1 is low before inversion as shown in FIG. 2(a). Therefore, the color-difference signals are controlled to increase their levels for this part. As a result, the amplitude level of the color saturation becomes a level α. Conversely, a part where a luminance level B2 is low as shown in FIG. 5 corresponds to a part where a luminance level B1 is high before conversion as shown in FIG. 2(a). Therefore, the color-difference signals are controlled to decrease their levels for that part. As a result, the amplitude level becomes a level β which is smaller than the level α.

The relation between the luminance level and the level of the color saturation is thus improved as compared with the relation obtained by the conventional arrangement. Therefore, even in the event of negative-to-positive inversion, the signals can be obtained at the degree of color saturation which naturally corresponds to the level of the luminance signal. The embodiment thus gives a good image with adequate colors.

Further, in accordance with the above-stated arrangement, the color saturation degree decreases at a part near the black level after the negative-to-positive inversion. This results in a picture in which the black color looks better, which gives a good picture quality. In other words, this also suppresses a low level chrominance and serves as a low level chrominance killer in processing a normal positive video signal.

While the embodiment is arranged to control the level of the color-difference signals after the inversion according to the luminance signal Y obtained before inversion, the invention is not limited to this. The arrangement may be changed to use the inverted luminance signal $\overline{Y}$ instead of the luminance signal obtained before inversion. In the event of that modification, the arrangement of the embodiment is changed either to invert the polarity of the signal output from the control signal generator or to invert the relation between the control voltage of the variable amplifiers 9a and 9b and the gains of them. Further, while the color-difference signals are arranged to be controlled after inversion in the case of FIG. 4, that arrangement may be also changed to control them either before the inversion or after a modulating process which is to be carried out within the encoder 8.

Figure 6:
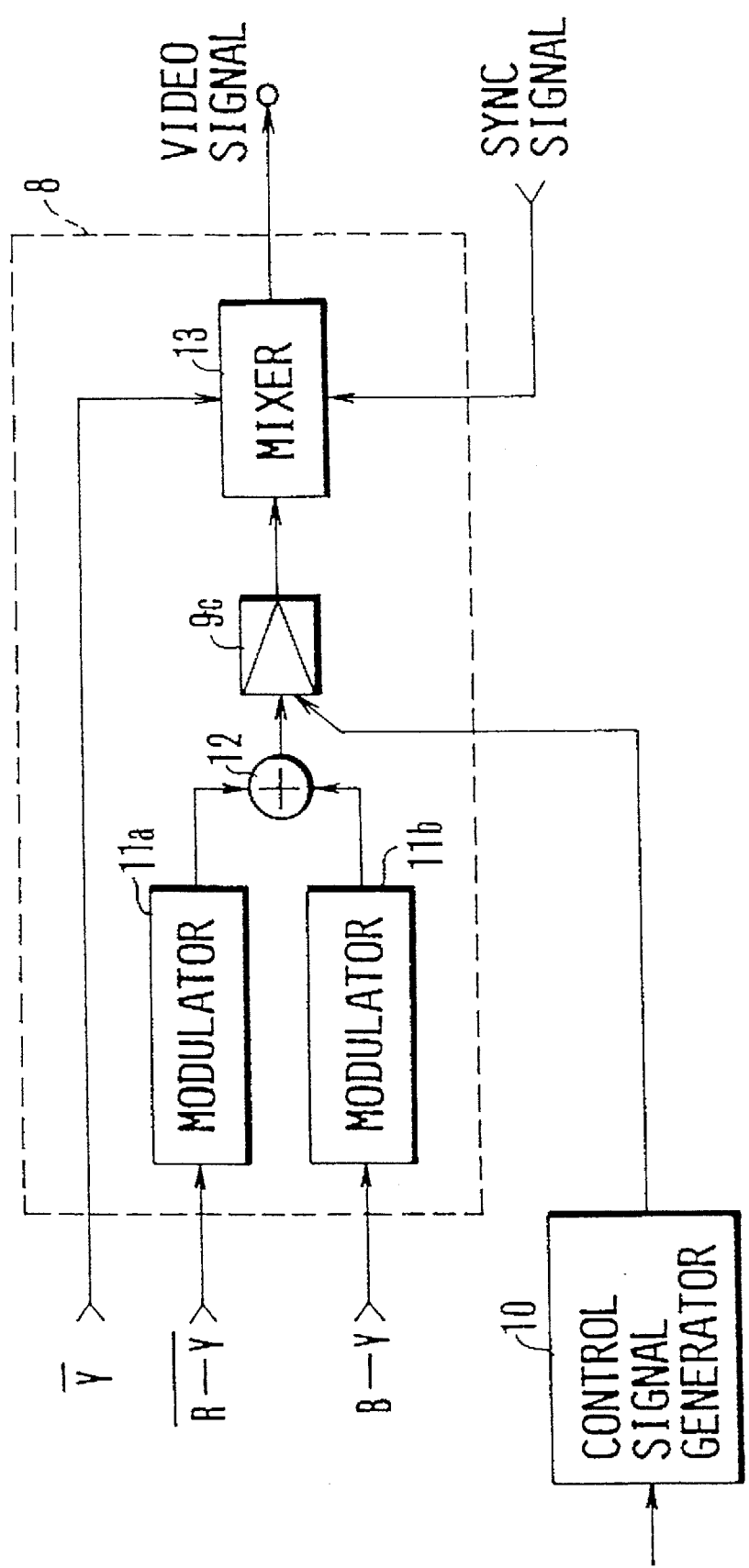
FIG. 6 is a block diagram showing the arrangement of a second embodiment of the invention.

FIG. 6 shows the arrangement of a second embodiment of the invention. The second embodiment is arranged to control the color-difference signals after the modulation process is carried out within the encoder 8. In this case, the encoder 8 which is generally employed is arranged to include a variable amplifier 9c. The variable amplifier 9c is of a gain variable, voltage-controlled type and is arranged to operate under the control of the control signal generator 10. Referring to FIG. 6, the encoder 8 further includes modulators 11a and 11b; an adder 12; and a mixer 13 which mixes together the luminance signal and the color-difference signals and is arranged to receive a synchronizing (hereinafter referred to as sync) signal.

The above-stated circuit arrangement of the encoder 8 enables the second embodiment to have the same advantages as those of the first embodiment described in the foregoing and to give also a good picture.

Figure 7A:
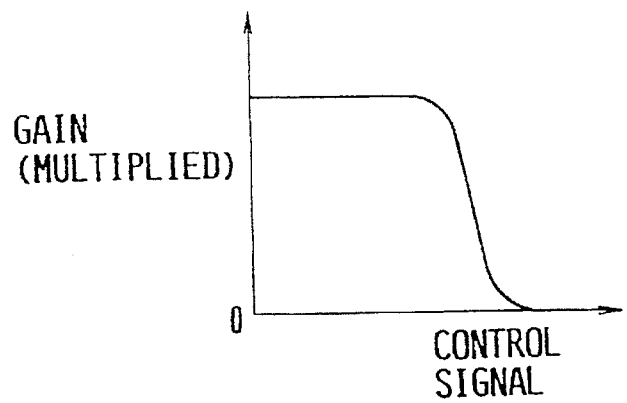
FIGS. 7(a) and 7(b) show by way of example the characteristics of variable amplifiers.
Figure 7B:
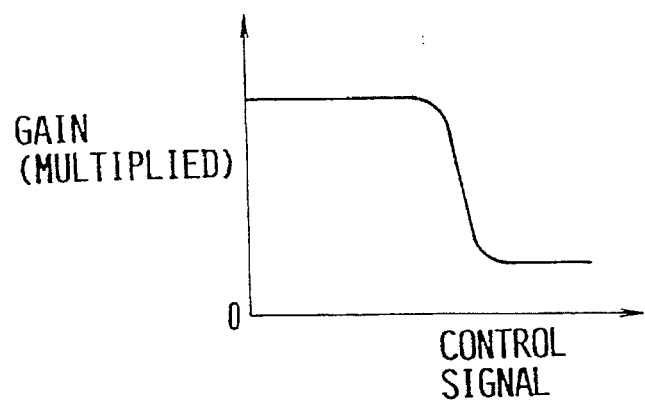

In each of the embodiments described, the variable amplifiers are arranged to be responsive to all the levels of the luminance signals. This arrangement, however, may be changed to have the variable amplifier arranged to be responsive only to a part of the levels of the luminance signal in such a way as to reduce only a black color component or a component of a level close to black after negative-to-positive inversion. This change gives a simple effect of preventing black color deviation to ensure a fine state of black color. In that instance, the characteristic of the control signal generator or that of the variable amplifier is changed. FIGS. 7(a) and 7(b) show by way of example the variations of characteristic of the variable amplifiers.

Figure 8:
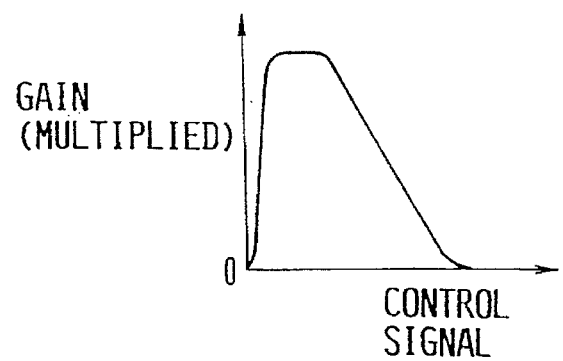
FIG. 8 shows by way of example another characteristic of the variable amplifiers.

Further, if the circuit arrangement of FIG. 4 is arranged to reduce the level of each color-difference signal at a part where the level of the non-inverted luminance signal Y is at a black color level or close thereto, the color component of the signal obtained after inversion at a high luminance level can be suppressed to attain an advantageous effect which corresponds to the high-light chrominance killer of a normal video signal. FIG. 8 shows an example of such a characteristic of the variable amplifier.

With the gain of the color-difference signals controlled on the basis of information on the luminance signal in this manner, a degree of color saturation corresponding to the level of the luminance signal can be obtained to give a good picture even in the event of the negative-to-positive inversion. Besides, the color saturation of white and black levels can be suppressed to give also a good picture.

Figure 9:
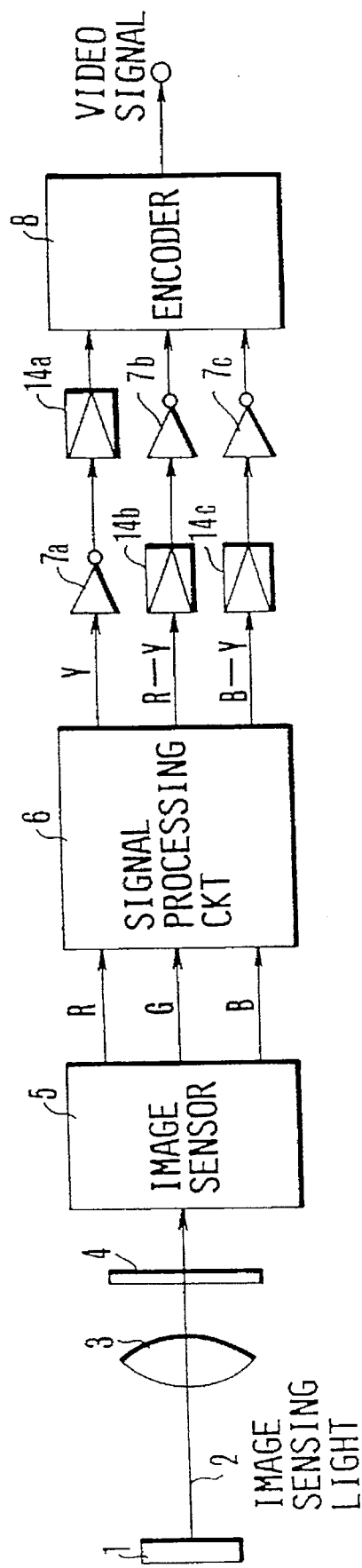
FIG. 9 is a diagram showing the arrangement of a third embodiment of the invention.

FIG. 9 shows the circuit arrangement of a TV camera apparatus arranged as a third embodiment of the invention. In FIG. 9, the same parts as those of FIGS. 1 to 8 are indicated by the same reference numerals and any duplicative description is omitted. Referring to FIG. 9, a signal amplifier 14a is disposed behind the inverter 7a provided for the luminance signal Y. Signal amplifiers 14b and 14a are disposed in front of the inverters 7b and 7c provided for the color-difference signals R-Y and B-Y.

The normal operation of the circuit arrangement described above is the same as that of the conventional camera apparatus shown in FIG. 1 and is, therefore, omitted from description. However, in the case of the third embodiment, at least one signal amplifier 14a, 14b or 14c is provided in the signal system including the inverter 7a, 7b or 7c. The provision of the signal amplifier or amplifiers enables the camera to control the image signal to be at a normal level even in cases where the image signal is produced at a low level. Therefore, in the event of an image sensing action on a negative film, the image signal can be corrected even if the level has been lowered due to compression by the gamma characteristic of the negative film or by the gamma characteristic of the signal processing operation. The embodiment thus gives a good picture with bright and adequate colors.

Further, while the amplifiers 14b and 14c are disposed in front of the inverters 7b and 7c, they may be arranged either in front of or in rear of the inverters 7b and 7c as desired, because: The inverted color-difference signals $\overline{R\text{-}Y}$ and $\overline{B\text{-}Y}$ merely have their polarity inverted. Further, in the case of the third embodiment, the color-difference signals are arranged to be amplified before modulation by the encoder 8. However, the color-difference signals (with the exception of a burst signal) may be arranged to be amplified not only before modulation but also after the modulation.

Figure 10:
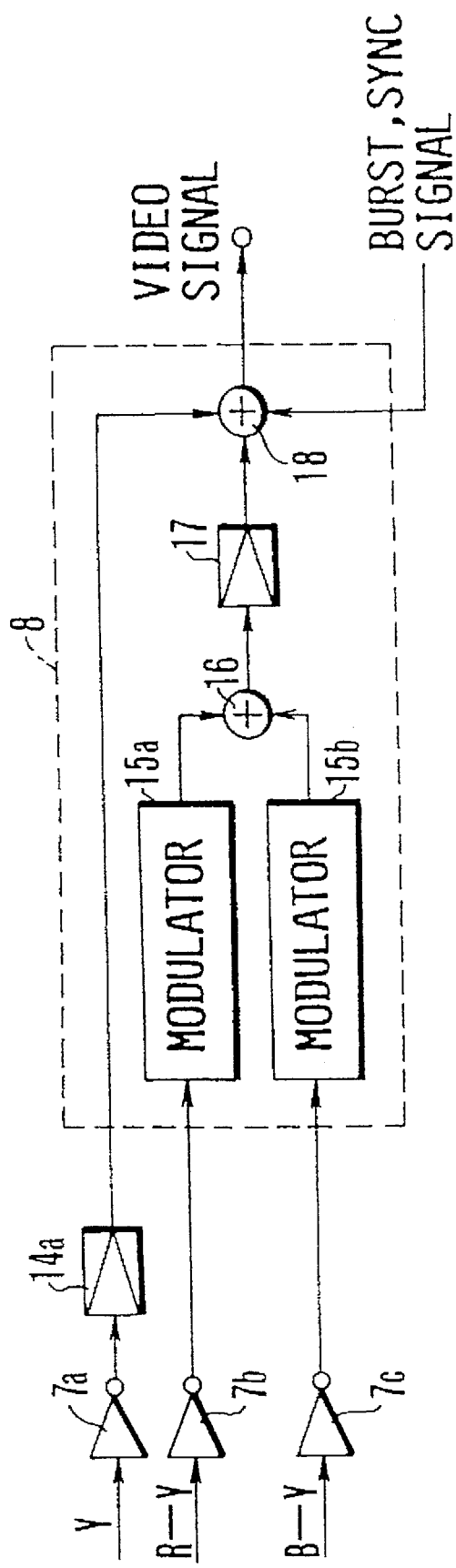
FIG. 10 is a diagram showing the arrangement of a fourth embodiment of the invention.

FIG. 10 shows the arrangement of a fourth embodiment of the invention, which is arranged to amplify the color signals after the modulation as mentioned above. Referring to FIG. 10, the encoder 8 includes modulators 15a and 15b which are arranged to modulate the color-difference signals; an adder 16; a signal amplifier 17 and another adder 18 which is arranged to receive burst and sync signals. In addition to the same advantage as that of the third embodiment shown in FIG. 9, it is another advantage of the fourth embodiment that only one amplifier is necessary for the color signals. Therefore, the arrangement of the camera can be simplified.

Figure 11:
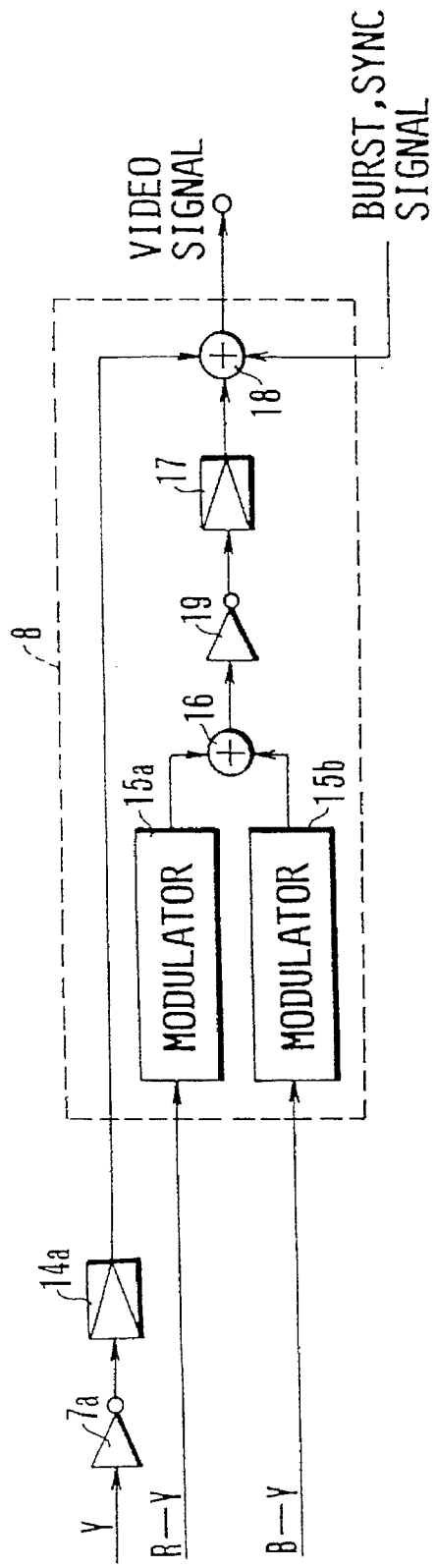
FIG. 11 is a diagram showing the arrangement of a fifth embodiment of the invention.

FIG. 11 shows the arrangement of a fifth embodiment of the invention. The fifth embodiment is arranged to have the modulated color-difference signals combined with each other by means of the adder 16 within the encoder 8 and, after that, to invert the output of the adder 16 by means of a negative-to-positive inverter 19 within the encoder 8. This arrangement permits use of only one inverter 19 for the color-difference signals, so that the arrangement of the camera also can be simplified.

Figure 12:
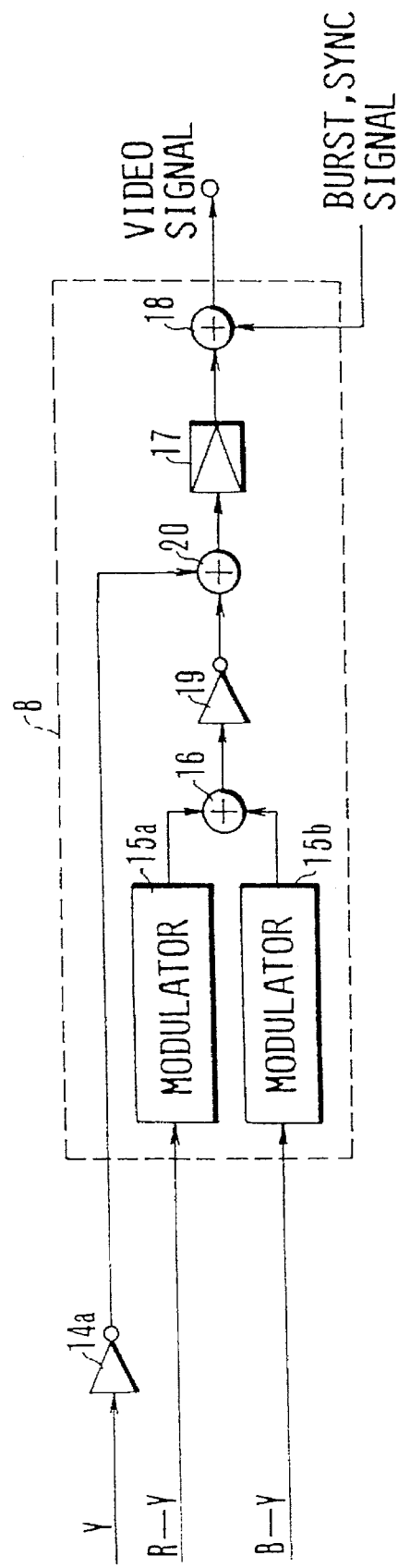
FIG. 12 is a diagram showing the arrangement of a sixth embodiment of the invention.

Further, FIG. 12 shows the arrangement of a sixth embodiment of the invention. In each of the embodiments described, signal amplifiers are discretely provided for the luminance signal after the inversion and for the color-difference signals. Whereas, the sixth embodiment is arranged to use only one signal amplifier 17 for these signals. In the case of FIG. 12, the luminance signal and the color-difference signals are mixed by means of an adder 20; and, after that, the output of the adder 20 is amplified before a sync signal and a burst signal are mixed. This arrangement also gives the same advantageous effects as those of other embodiments.

Figure 13A:
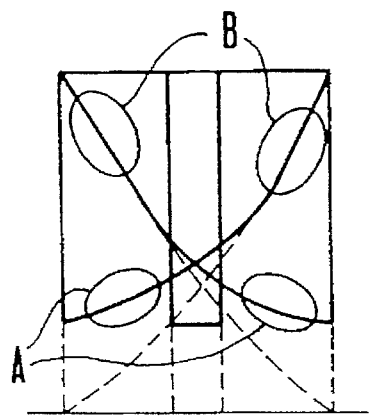
FIGS. 13(a) to 13(d) show the control characteristics of the third to sixth embodiments of the invention.
Figure 13B:
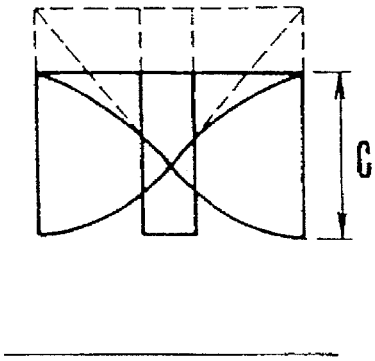
Figure 13C:
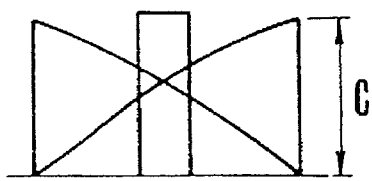
Figure 13D:
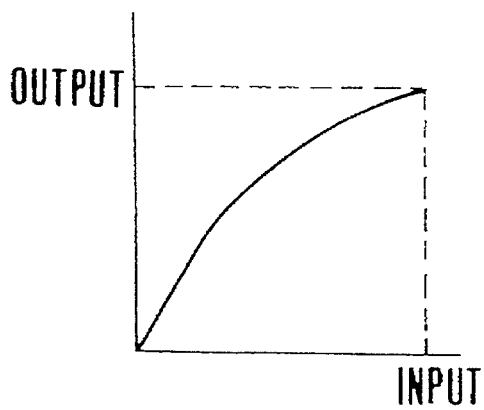

The following briefly describes relations existing among the gamma characteristic of the negative film, the gamma characteristic of the camera signal processing action, that of the iris of the camera and that of each of the signal amplifiers newly added in each of the different embodiments described in the foregoing:

The gamma circuit which is provided for processing the camera signal is arranged to have the result of gamma process application to a given input level at a certain fixed value. Therefore, the degree of gamma compression effected on the side of the camera varies according to the degree to which the iris is opened. Further, the effect of gamma process on the camera signal output is intended to correct the characteristic of the display tube of the TV monitor. If the effect of gamma process (gamma value=0.45) on the camera signal output varies to a great degree, the tone gradation would be lost. Therefore, the iris opening degree must be determined according to the conditions (the kind, developed state, etc.) of the film in use. The degree to which the signal is to be compressed as a whole is determined by the film conditions. In view of this, an optimum amplification factor is selected for the amplifier according to the above-stated compression degree. What is shown in FIGS. 3(a) to 3(e) is shown in further detail in FIGS. 13(a) to 13(d), wherein: FIG. 13(a) shows in outline the output waveform of the image sensor. This corresponds to a waveform obtained before the gamma process performed by the signal processing circuit. FIG. 13(b) shows in outline a waveform obtained after the gamma process. FIG. 13(c) shows a waveform obtained by inverting the waveform of FIG. 13(b). In FIG. 13(a), parts A represent such parts that are compressed by the gamma characteristic of the film, while parts B represent parts expanded thereby. If the waveform is inverted as it is, the gamma process-would be excessively applied, that is, the gamma value would be caused to exceed "0.45". Therefore, by utilizing the gamma characteristic of the circuit, the parts B of FIG. 13(a) are compressed and the parts A are expanded to bring the gamma value closer to the gamma value of the camera. This is accomplished by controlling the level of the whole waveform of FIG. 13(a) by means of the iris, etc. FIG. 13(d) shows in outline the gamma characteristic of the circuit. As shown, the characteristic of the circuit is such that the signal is raised (expanded) at a low input level part and compressed at a high input level part. Therefore, the gamma characteristic can be used for the above-stated process. The term "the gamma characteristic of the circuit" as used herein means that the circuit has a fixed characteristic relative to a certain input level. Hence, in cases where the gamma characteristic of a circuit is to be used in correcting the gamma characteristic of a film as mentioned above, the level of input to a gamma correction circuit bears an important meaning.

The signal which is thus corrected for the gamma characteristic of the film by the gamma correction circuit becomes as shown in FIG. 13(b). The level C of the signal is clearly compressed. The level C of the signal waveform obtained by inverting the waveform of FIG. 13(b) is also clearly in a compressed shape as shown in FIG. 13(c). However, the signal, as the output of the camera, can be proximately brought close to the gamma characteristic of the camera (gamma value=0.45). Since the characteristic of the signal is thus brought close to the gamma characteristic of the camera before it is compressed according to the gamma characteristic of the film and by the process of the gamma correction circuit of the camera, the signal becomes smaller. The small signal is, therefore, amplified up to a normal level. This arrangement gives the signal at an adequate level without much degrading its tone gradation. In this connection, it is important to appositely control the iris. To meet this requirement, an automatic iris control arrangement has been conceived to facilitate a control over the iris. This arrangement is well known and therefor requires no detailed description. It is apparent also from the above description that the iris position is appositely set by the automatic iris control arrangement according to the kind and the developed state of the film. It is also apparent that the amplification factor of the amplifier also varies according to the conditions of the film.

While the level of the signal before the gamma correction has been described to be varied by means of the iris in the foregoing, this purpose can be also attained by a circuit arrangement instead of by the iris. In that instance, a variable gain amplifier is arranged before the gamma (correction) circuit to have its gain controlled in place of the aperture of the iris.

In the foregoing, a simple method of utilizing the normal gamma circuit of a camera (normally used for a positive image sensing operation) has been described. The method necessitates control over the level of input to the gamma circuit. However, this arrangement may be conversely changed to vary the normal gamma characteristic of the gamma circuit in the event of an image sensing operation on a negative film.

In the foregoing, the image sensing operation on a negative film has been described. However, the TV camera apparatus according to this invention is designed not solely for that purpose but also for positive image sensing. For the positive image sensing operation, signal paths are arranged to process signals without passing through the inverters and the amplifiers provided for the luminance signal and the color-difference signals. A switch is provided for selection of the negative image sensing operation or the positive image sensing operation. Further, it goes without saying that the invention is applicable not only to color cameras but also to black-and-white cameras.

As described above, in accordance with this invention, at least one signal amplifier is provided in the signal system extending through the negative-to-positive converter. Therefore, the output level of the image signal can be controlled to reach a normal level. This enables the embodiment to give a bright picture even in the event of sensing an image existing on a negative film, so that a good picture can be obtained.

Figure 14:
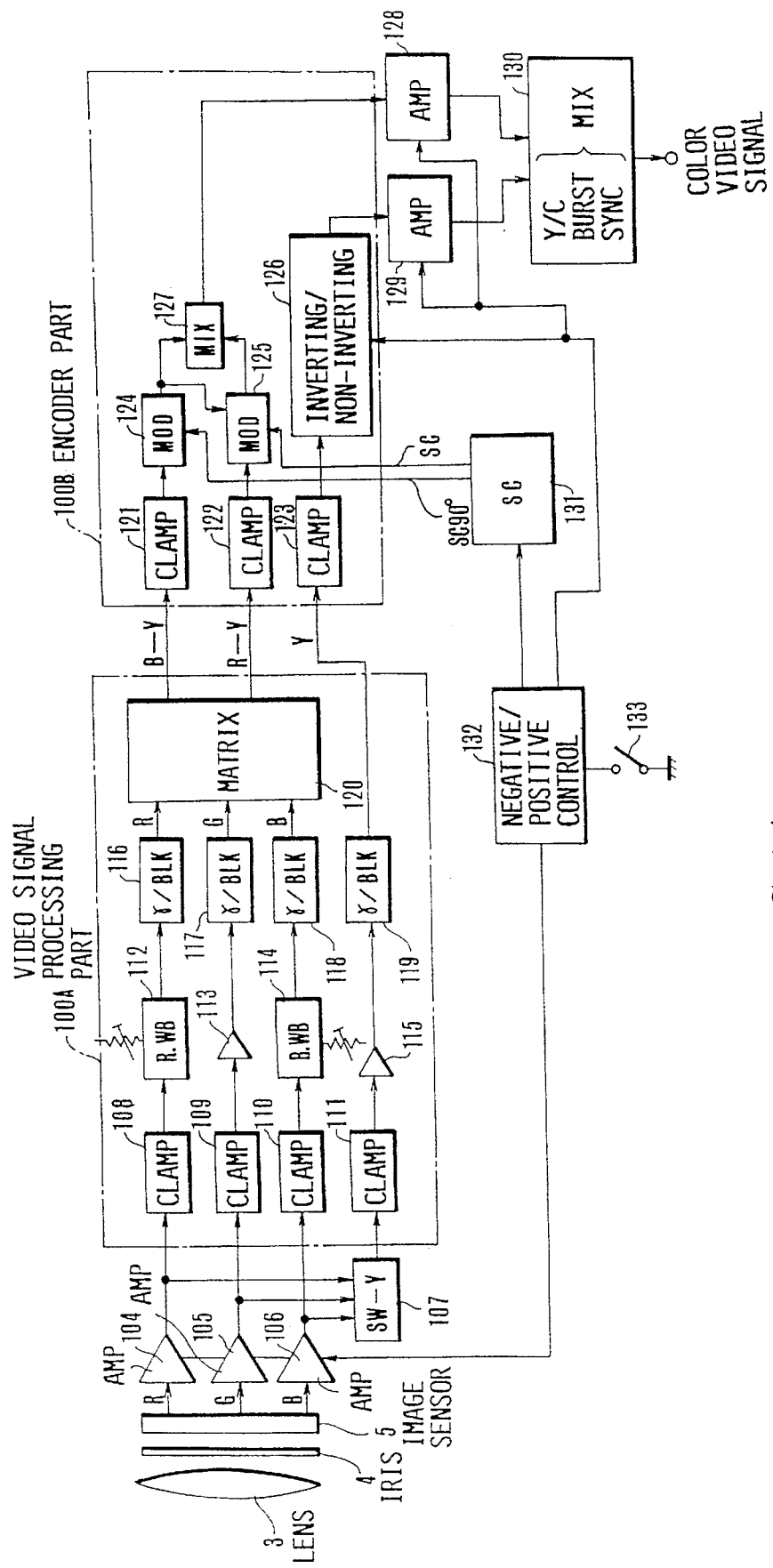
FIG. 14 shows in a block diagram a seventh embodiment of the invention.

Next, a solid-state image sensing apparatus arranged according to this invention as a seventh embodiment thereof is described with reference to drawings:

FIG. 14 shows in a block diagram the arrangement of the seventh embodiment. Referring to FIG. 14, a lens optical system 3 is arranged to form an object image on a image sensor 5. An iris 4 is arranged to adjust the amount of exposure to light. The image sensor 5 is a solid-state image sensor which is arranged to convert the object image formed thereon by the lens optical system into an electrical signal. Color signal amplifiers 104, 105 and 106 are arranged to amplify, at a variable degree of amplification, color signals which are output from the image sensor 5 in a state of being divided for three colors R (red), G (green) and B (blue). A switch circuit 107 is arranged to form a luminance signal Y by switching the three color signals R, G and B which have been amplified by the color signal amplifiers 104, 105 and 106. The outputs of the color signal amplifiers 104, 105 and 106 and the output of the switch circuit 107 are supplied to a video signal processing part 100A.

The video signal processing part 100A includes clamp circuits 108, 109 and 110 which are arranged to receive the amplified three color signals and to determine the DC level of these signals by clamping them. Another clamp circuit 111 is arranged to determine, by clamping, the DC level of the luminance signal Y formed by the switch circuit 107. A variable amplifier 112 is arranged to vary the amplitude level of the signal R clamped by the clamp circuit 108. A variable amplifier 113 is arranged to amplify the clamped signal G. A variable amplifier 114 is arranged to vary the amplitude level of the clamped signal B. An amplifier 115 is arranged to amplify the clamped luminance signal Y. Gamma process circuits 116, 117, 118 and 119 are arranged to carry out a gamma process and a blanking process on the color signals R, G and B and the luminance signal Y respectively. A matrix circuit 120 is arranged to receive the color signals R, G and B processed by the gamma process circuits 116, 117 and 118 and to form color-difference signals B-Y and R-Y by carrying out a matrix computing operation on these color signals. The outputs of the matrix circuit 120 and the output of the gamma process circuit 119 are supplied to an encoder part 100B.

The encoder part 100B includes clamp circuits 121 and 122 which are arranged to clamp the color-difference signals B-Y and R-Y and to determine the DC level (potential) of the color-difference signals. A clamp circuit 123 is provided for the luminance signal Y and is arranged to determine the DC level of the luminance signal Y. Modulators 124 and 125 are arranged to receive, from a subcarrier generator 131, subcarriers SC90° and SC having a phase difference of 90 degrees between them and to modulate the color-difference signals B-Y and R-Y.

An inverting/non-inverting amplifier 126 is provided for the luminance signal Y and is arranged either to invert the luminance signal Y in accordance with a control signal from a negative/positive control part 132 or to produce the luminance signal Y without inverting its positive phase. A mixer 127 mixes the color-difference signals modulated by the modulators 124 and 125.

A luminance signal amplifier 129 is arranged to amplify the luminance signal coming from the encoder part 100B. The amplifying degree of the amplifier 129 can be changed to a value set by a control signal output from the negative/positive control part 132. A chrominance signal amplifier 128 is arranged to amplify a chrominance signal C which is a color signal formed through modulating and mixing processes within the encoder part 100B. Like the luminance signal amplifier 129, the amplifying degree of the chrominance signal amplifier 128 can be changed to a value set by the control signal output from the negative/positive control part 132. A mixing circuit 130 is arranged to mix the luminance signal Y and the chrominance signal C and to add to the mixture a burst signal and a sync signal. The output of the mixing circuit 130 is output to the outside as a color video signal.

A reference numeral 131 denotes the subcarrier generator which generates the subcarriers SC and SC90° with a phase difference of 90 degrees between them. A numeral 132 denotes the negative/positive control part which is arranged to perform a change-over control between a negative signal processing mode and a positive signal processing mode. A negative/positive change-over switch 133 is arranged to effect a change-over between the mode of shooting the positive image of an ordinary object and the mode of shooting a negative film image. The following describes the operation of the image sensing apparatus which is arranged as the embodiment of this invention as described above:

The operation in the mode of shooting an ordinary picture-taking object, i.e., sensing a positive image is first described. The positive image of the object is formed on the image sensor 5 by the optical system which includes the lens 3 and the iris 4. The image is then divided into three color signals R, G and B. The three color signals thus output from the image sensor 5 are amplified by the color signal amplifiers 104, 105 and 106 up to a specific setting value. Normally, the amplifying degrees of these color signal amplifiers are set on the basis of a value for the positive image of an ordinary object. More specifically, the amplifying degree is set by taking into consideration the processing operation of the circuit arrangement in such a manner that, when the output value of the image sensor 5 is X mV, the ultimate color image output becomes 1 $mV_{p-p}$ (75 ohm at the ultimate end). Then, the luminance signal Y is composed by switching the three color signals R, G and B. The clamp circuits 108, 109, 110 and 111 then determine DC potential levels by clamping the signals R, G, B and Y respectively. The amplifiers 113 and 115 amplify the color signal G (green) and the luminance signal Y up to a setting value.

The variable amplifiers 112 and 114 which are provided for adjusting the gains of the color signals R and B make white balance adjustment. The gamma process circuits 116, 117, 118 and 119 perform the gamma process and the blanking process on the signals R, G, B and Y. The color signals R, G and B are supplied to the matrix circuit 120. The matrix circuit 120 then forms the color-difference signals B-Y and R-Y. The luminance signal Y is supplied to the encoder part 100B along with these color-difference signals B-Y and R-Y. At the encoder part 100B, these signals B-Y, R-Y and Y are clamped to have their DC levels determined by the clamp circuits 121, 122 and 123. The color-difference signals are modulated with the subcarriers by the modulators 124 and 125. The modulated color-difference signals are mixed by the mixer 127. The output of the mixer 127 is amplified by the chrominance signal amplifier 128 up to a setting value. The amplified chrominance signal is supplied to the mixing circuit 130. The luminance signal Y which is supplied from the gamma process circuit 119 to the clamp circuit 123 are supplied to the inverting/non-inverting amplifier 126. In this instance, the amplifier 126 acts as a non-inverting amplifier to produce the luminance signal without inverting its positive phase and supplies it to the luminance signal amplifier 129. The amplifier 129 amplifies the luminance signal to a setting value and supplies it to the mixing circuit 130. The mixing circuit 130 mixes the luminance signal with the above-stated chrominance signal and then adds, to the mixture, the color burst signal and the sync signal to obtain and produce a color video signal therefrom.

Next, the operation in the mode of shooting a negative film, that is, the operation to sense a negative image and to produce a positive image is performed as follows: A negative image is formed on the image sensor 5. The negative/positive change-over switch 133 then operates to supply a control signal from the negative/positive control part 132 to the color signal amplifiers 104, 105 and 106. The amplifying degrees of the amplifiers are lowered by this. Meanwhile, a control signal is supplied from the negative/positive control part 132 to the subcarrier generator 131. By this, the phases of the subcarriers SC90° and SC are respectively inverted and the subcarriers are produced in the inverted state. The modulators 124 and 125 receive the subcarriers SC90° and SC with their phases inverted from the phases obtained in the mode of sensing a positive object image. The color-difference signals are modulated with the phase-inverted subcarriers and are supplied to the mixer 127. The mixer 127 mixes the modulated color-difference signals to obtain a chrominance signal. The chrominance signal is supplied to the chrominance signal amplifier 128 to be amplified there. The inverting/non-inverting amplifier 126 is shifted to its inverting position by a control signal received from the negative-positive control part 132. The amplifier 126 then inverts the luminance signal Y and supplies it to the luminance signal amplifier 129. Each of the chrominance signal and luminance signal amplifiers 128 and 129 has its amplifying degree raised by the control signal from the negative/positive control part 132. As a result, the luminance signal and the chrominance signal are amplified to a higher amplifying degree than in the case of the positive image. The luminance signal Y and the chrominance signal C are then mixed at the mixing circuit 130, and the color burst signal and the sync signal are added to the mixture to obtain a positive color video signal. The circuit 130 thus outputs the positive color video signal.

The picture of the positive image of an ordinary object can be taken by the above-mentioned arrangement and operation. In addition to that, even when the image sensing action is performed on a negative film, a positive picture of a rich tone gradation can be obtained with good linearity and without degrading the S/N ratio. Further, the negative-to-positive inversion circuit can be constructed at a relatively low cost.

As described above, in accordance with this invention, an adequate positive color video signal can be obtained by sensing the positive image of an ordinary object. In addition to that, a positive color video signal is obtainable from a negative image on a negative film with a good linear characteristic and a rich tone gradation, without ruining signals and without degrading the S/N ratio. In the latter case, control signals are output from the negative/positive control part to change the amplifying degrees of the color signal amplifiers; to invert the phases of the subcarriers which are output from the subcarrier generator with a 90 degree phase difference between them; to invert the phase of the luminance signal supplied to the luminance signal amplifier; and to change the amplifying degrees of the chrominance signal and luminance signal amplifiers. More specifically, the operation in this mode is performed as follows: A control signal is output from the negative positive control part to lower the amplifying degrees of the color signal amplifiers. The phases of the subcarriers which are output from the subcarrier generator at the phase difference of 90 degrees are inverted before they are supplied to the encoder part. The phase of the luminance signal is inverted before it is supplied to the luminance signal amplifier. After that, the amplifying degree of the chrominance signal amplifier and that of the luminance signal amplifier are increased. It is another advantage of the solid-state image sensing apparatus embodying the invention that the negative-to-positive inversion circuit can be arranged at a relatively low cost.

What is claimed is:

1. An image pickup apparatus, comprising::
   a) image pickup means for converting an optical image into an electrical signal;
   b) processing means for producing a luminance signal and color-difference signals from the electrical signal outputted from said image pickup means;
   c) a first inverting means for inverting a level of said luminance signal outputted from said processing means with respect to a predetermined level;
   d) second inverting means for inverting a level of said color-difference signals outputted from said processing means with respect to predetermined levels;
   e) a first variable gain amplifier means for amplifying said luminance signal inverted by said first inverting means;
   f) modulation means for modulating said color-difference signals inverted by said second inverting means;
   g) a second variable gain amplifier means for amplifying said color-difference signals modulated by said modulation means; and
   h) mixing means for mixing outputs of said first and second variable gain amplifier means.

2. An image pickup apparatus, comprising:
   a) image pickup means for converting an optical image into an electrical signal;
   b) processing means for producing a luminance signal and color-difference signals from the electrical signal outputted from said image pickup means;
   c) a first inverting means for inverting a level of said luminance signal outputted from said processing means with respect to a predetermined level;
   d) a second inverting means for inverting said color-difference signals outputted from said processing means with respect to predetermined levels:
   e) modulation means for modulating said color-difference signals before being inverted by said second inverting means;
   f) mixing means for mixing outputs of said first and second inverting means; and
   g) variable gain amplifier means for amplifying an output of said mixing means.

* * * * *